(12) United States Patent
Tsuchiya et al.

(10) Patent No.: US 11,959,828 B2
(45) Date of Patent: Apr. 16, 2024

(54) TIRE STATE ESTIMATION SYSTEM AND TIRE STATE ESTIMATION PROGRAM

(71) Applicant: BRIDGESTONE CORPORATION, Tokyo (JP)

(72) Inventors: Kei Tsuchiya, Tokyo (JP); Masafumi Daifuku, Tokyo (JP); Teppei Mori, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 749 days.

(21) Appl. No.: 17/057,836

(22) PCT Filed: Apr. 15, 2019

(86) PCT No.: PCT/JP2019/016188
§ 371 (c)(1),
(2) Date: Nov. 23, 2020

(87) PCT Pub. No.: WO2019/225213
PCT Pub. Date: Nov. 28, 2019

(65) Prior Publication Data
US 2021/0223143 A1    Jul. 22, 2021

(30) Foreign Application Priority Data
May 25, 2018    (JP) .................................. 2018-100691

(51) Int. Cl.
*G01M 17/02* (2006.01)
*G06T 7/00* (2017.01)
*G06T 7/62* (2017.01)

(52) U.S. Cl.
CPC ......... *G01M 17/027* (2013.01); *G06T 7/0004* (2013.01); *G06T 7/62* (2017.01); *G06T 2207/30164* (2013.01)

(58) Field of Classification Search
CPC ..... G01M 17/027; G01M 17/02; G06T 7/004; G06T 7/62; G06T 2207/30164
See application file for complete search history.

(56) References Cited

U.S. PATENT DOCUMENTS

2012/0020526 A1    1/2012  Teti et al.
2015/0139498 A1*   5/2015  Rotatori ................ G01B 11/02
                                                        382/104
2015/0143886 A1    5/2015  Rotatori et al.

FOREIGN PATENT DOCUMENTS

JP          4708759 B2 *   6/2011
JP          4708759 B2     6/2011
(Continued)

OTHER PUBLICATIONS

Yue, Jingxia et al. "Depth Estimation for Surface Cracks Based on Crack Mouth Opening Displacement Measurement", Twentieth International Offshore and Polar Engineering Conference, Beijing China, Jun. 2010.*

(Continued)

*Primary Examiner* — Manuel L Barbee
(74) *Attorney, Agent, or Firm* — Sughrue Mion, PLLC

(57) ABSTRACT

A tire state estimation system (10) is provided with a crack shape acquisition unit (240) for acquiring the shape of a crack on the outer surface of a tire, a crack information DB (230) for holding a correspondence relationship in which at least either degree of opening or deviation width of the crack based on the shape of the crack is associated with the depth of the crack, and a crack depth estimation unit (250) for estimating the depth of the crack based on the acquired crack shape and the correspondence relationship.

5 Claims, 6 Drawing Sheets

(56) References Cited

FOREIGN PATENT DOCUMENTS

| | | |
|---|---|---|
| KR | 10-2014-0021137 A | 2/2014 |
| KR | 10-1556354 B1 | 10/2015 |
| WO | 2017/060739 A1 | 4/2017 |

OTHER PUBLICATIONS

International Search Report for PCT/JP2019/016188 dated Jun. 18, 2019 [PCT/ISA/210].

* cited by examiner

TIRE STATE ESTIMATION SYSTEM AND TIRE STATE ESTIMATION PROGRAM

CROSS REFERENCE TO RELATED APPLICATIONS

This application is a National Stage of International Application No. PCT/JP2019/016188 filed Apr. 15, 2019, claiming priority based on Japanese Patent Application No. 2018-100691 filed May 25, 2018.

TECHNICAL FIELD

The present invention relates to a tire state estimation system and a tire state estimation program for predicting the life of the tire.

BACKGROUND ART

Conventionally, a method of modeling a crack generated in a tire and predicting the life of the tire by a finite element method (FEM) analysis has been known (See Patent Document 1).

Specifically, Patent Document 1 discloses that displacement including stress and strain generated in a tire is calculated by FEM analysis, and crack propagation generated in the tire is predicted based on the displacement.

CITATION LIST

Patent Literature

[PTL 1] Japanese Patent No. 4708759

SUMMARY OF INVENTION

In the method for predicting crack propagation described in the above-mentioned Patent Document 1, it is necessary to recognize the detailed shape of the present crack, specifically, the length, width (degree of opening), and depth of the crack.

However, for example, in the case of a tire mounted on a vehicle (construction vehicle) traveling on an uneven ground such as a mine (tire for construction vehicle), it is difficult to obtain a specific shape (in particular, internal shape such as depth) of a crack. Therefore, there is a problem that it is not realistic to predict crack propagation by applying the method described in Patent Document 1 to a tire in use.

It is therefore an object of the present invention to provide a tire state estimation system and a tire state estimation program capable of estimating the depth of a crack based on the shape of the crack recognizable from the outer surface of the tire.

One aspect of the present invention is a tire state estimation system (tire state estimation system 10) for predicting a life of a tire (for example, a tire 21) based on a state of a crack (crack C) generated on an outer surface of the tire. The tire state estimation system includes a crack shape acquisition unit (crack shape acquisition section 240) for acquiring the shape of the crack on the outer surface, a crack information holding unit (crack information DB 230) for holding a correspondence relationship (correspondence 231a through 231c) in which at least one of degree of opening (Width W) or deviation width (deviation width S) of the crack based on the shape of the crack is associated with depth (Depth D) of the crack, and a crack depth estimation unit (crack depth estimation unit 250) for estimating the depth of the crack based on the shape of the crack acquired by the crack shape acquisition unit and the correspondence relationship.

One aspect of the present invention is a tire state estimation program for predicting a life of a tire based on a state of a crack generated on an outer surface of the tire and a computer includes a crack information holding unit for holding a correspondence relationship in which at least one of degree of opening and deviation width of the crack based on the shape of the crack is associated with depth of the crack. The tire state estimation program causes the computer to execute a crack shape acquiring process for acquiring the shape of the crack on the outer surface and a crack depth estimation process for estimating the depth of the crack based on the acquired shape of the crack and the corresponding relationship.

DESCRIPTION OF EMBODIMENTS

Figure 1:
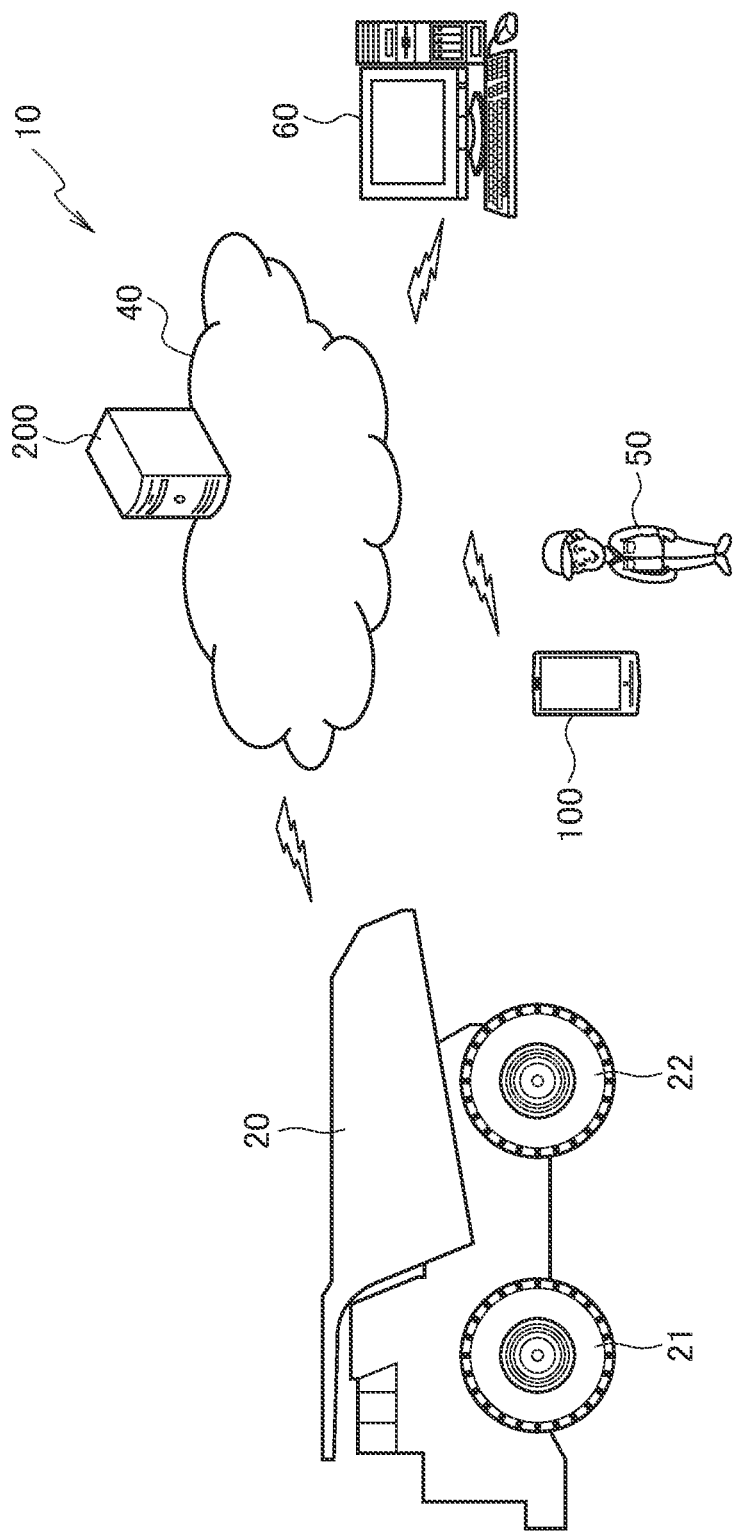
FIG. 1 is an overall schematic diagram of a tire state estimation system 10.

Hereinafter, an embodiment will be described based on the drawings. It should be noted that the same or similar reference numerals are given to the same functions and structures, and the description thereof will be omitted as appropriate.

(1) OVERALL SCHEMATIC CONFIGURATION OF TIRE STATE ESTIMATION SYSTEM

FIG. 1 is an overall schematic configuration diagram of a tire state estimation system 10 according to the present embodiment. As shown in FIG. 1, the tire state estimation system 10 includes a terminal device 60, a portable terminal 100, and a tire information management server 200. The terminal device 60, the portable terminal 100 and the tire information management server 200 are connected through a communication network 40.

A construction vehicle 20 is a vehicle traveling on uneven ground such as a mine. Specifically, the construction vehicle 20 is a large dump truck. The construction vehicle 20 has a radio communication function and can be connected via the communication network 40 to the tire state estimation system 10.

The construction vehicle 20 is mounted with a tire 21 and a tire 22. The tire 21 is mounted at a front wheel position, and the tire 22 is mounted at a rear wheel position. The configuration of the rear wheel may be a double tire.

Figure 2:
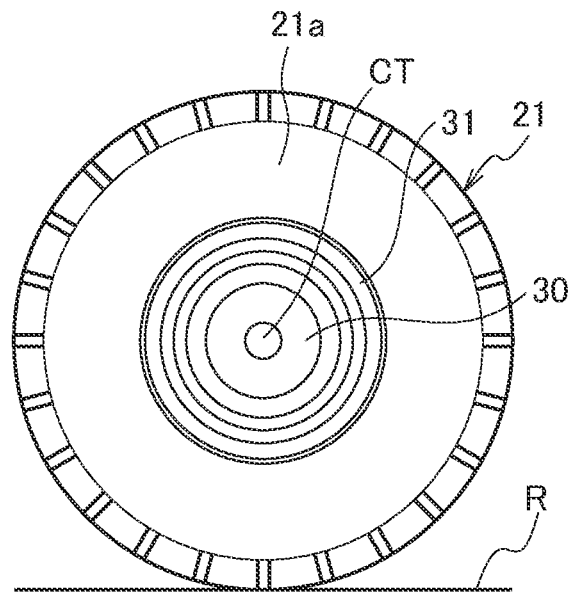
FIG. 2 is a side view of a single piece of tire 21.

Since the construction vehicle 20 travels on an uneven ground, a sharp stone or the like on the road surface R (not shown in FIG. 1, see FIG. 2) tends to cause a cut flaw (crack) in a tire side portion 21a (See FIG. 2). In particular, cracks are likely to occur in the tire side portion 21a on the outer side when the vehicle is mounted with a tire.

The worker 50 is engaged in the operation of the construction vehicle 20. Specifically, the worker 50 manages the state of the tire 21 and the tire 22 mounted on the construction vehicle 21, and performs work corresponding to the necessity of tire replacement or repair. The worker 50 can use the terminal device 60 and the portable terminal 100.

The terminal device 60 is typically implemented by a personal computer located in a field management office (backyard), such as a mine. The terminal device 60 is used for retrieval and acquisition of tire information managed by the tire information management server 200.

The portable terminal 100 is typically implemented by a portable communication terminal such as a smartphone or tablet terminal that is connectable to a mobile communication network (PLMN). Similar to the terminal device 60, the portable terminal 100 is used for retrieval and acquisition of tire information managed by the tire information management server 200.

The tire information management server 200 manages information related to the tire 21 and the tire 22. Specifically, the tire information management server 200 holds the type of the construction vehicle 20, the sizes of the tires 21, the tires 22, and rim wheels 30 (not shown in FIG. 1, see FIG. 2), setting information (set pressure according to load, etc.), and the use history of the tires 21, the tires 22, and the rim wheels 30 (driving time, distance traveled, presence/absence of attachment/detachment, etc.).

The tire information management server 200 updates the use history or the like in response to an input from the terminal device 60 or the portable terminal 100.

In particular, in the present embodiment, the tire information management server 200 predicts the life of the tire based on the state of cracks generated on the outer surface of the tire 21 and the tire 22.

FIG. 2 is a side view of the tire 21. As shown in FIG. 2, the tire 21 is assembled to the rim wheel 30. The tire 22 is also assembled to the rim wheel 30 like the tire 21.

The rim wheel 30 has a predetermined radial size (for example, 63 inches) corresponding to the specifications of the construction vehicle 20. An outer peripheral part of the rim wheel 30 is formed with a rim flange portion 31. The shape (size) of the rim flange portion 31 is different according to the specification of the rim wheel 30.

The radial size is a distance from the center CT of the rim wheel 30 to the radially outer end of the rim wheel 30, which is 2 times the linear distance (diameter), and does not include the rim flange portion 31.

The outer diameter of the tire 21 is the sum of the radial size of the rim wheel 30 and the radial size of the tire side portion 21a. The tire side portion 21a refers to a portion from an inner end of a bead portion (not shown) of the tire 21 in a tire radial direction to a ground contact end of a tread portion (not shown) of the tire 21 with a road surface R in a tire width direction.

However, the imaging range in the side view of the tire 21 may be interpreted as the tire side portion 21a.

(2) FUNCTIONAL BLOCK CONFIGURATION OF TIRE STATE ESTIMATION SYSTEM

Next, a functional block configuration of the tire state estimation system 10 will be described. Specifically, the functional block configuration of the tire information management server 200 will be described.

Figure 3:
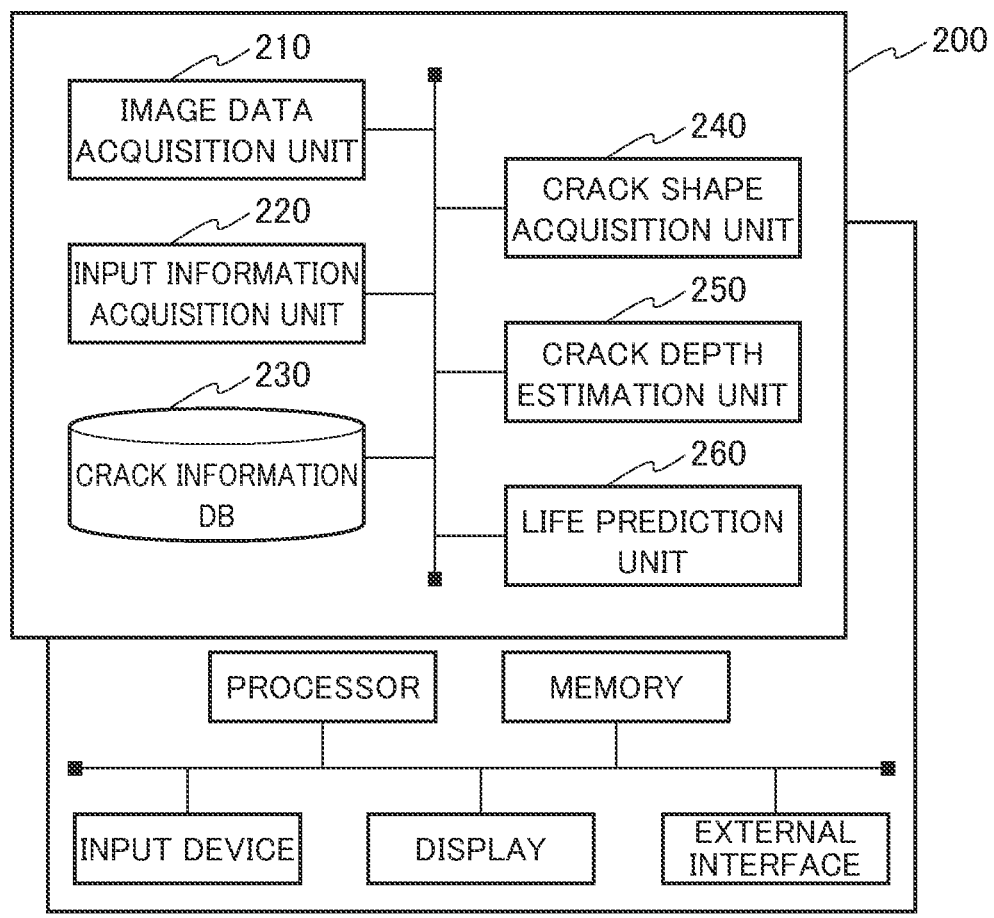
FIG. 3 is a functional block diagram of the tire information management server 200.

FIG. 3 is a functional block diagram of the tire information management server 200. As shown in FIG. 3, the tire information management server 200 includes an image data acquisition unit 210, an input information acquisition unit 220, a crack information DB 230, a crack shape acquisition unit 240, a crack depth estimation unit 250, and a life prediction unit 260.

An image data acquisition unit 210 acquires image data obtained by imaging a tire 21 (and a tire 22, and same as below). In the present embodiment, the image data acquisition unit 210 acquires image data obtained by imaging the outer surface of the tire 21 using the camera function mounted on the portable terminal 100 by the worker 50 via the communication network 40.

The image data acquisition unit 210 may acquire not only still image data but also moving image data.

An input information acquisition unit 220 acquires information inputted by the worker 50. Specifically, the input information acquisition unit 220 acquires information indicating the shape of a crack C (see FIG. 7) generated on the outer surface of the tire 21, which the worker 50 visually recognizes.

The information includes the length, width (degree of opening), deviation (shift) width, position and angle (direction) of the crack C. The worker 50 may measure the information by using a measuring instrument such as a ruler, or may measure the information by using a portable terminal 100 installed with an application capable of replacing the measuring instrument.

The crack information DB 230 is a database composed of information on a crack C generated on the outer surface of the tire 21 (crack information). In this embodiment, the crack information DB 230 constitutes a crack information holding unit.

Specifically, the crack information DB 230 holds various data indicating the correspondence between the shape of the outer surface of the crack C and the depth (see Depth D in FIG. 8) of the crack C. The depth of the crack C is the distance from the position of the outer surface of the tire 21 (tire side portion 21a) to the tip of the crack C located closest to the inner surface of the tire in the depth direction.

In particular, the crack information DB 230 holds a correspondence relationship in which at least either the degree of opening (See width W in FIG. 8) or the deviation width (see deviation width S in FIG. 9) of the crack C based on the shape of the crack C on the outer surface is associated with the depth of the crack C.

Figure 5:
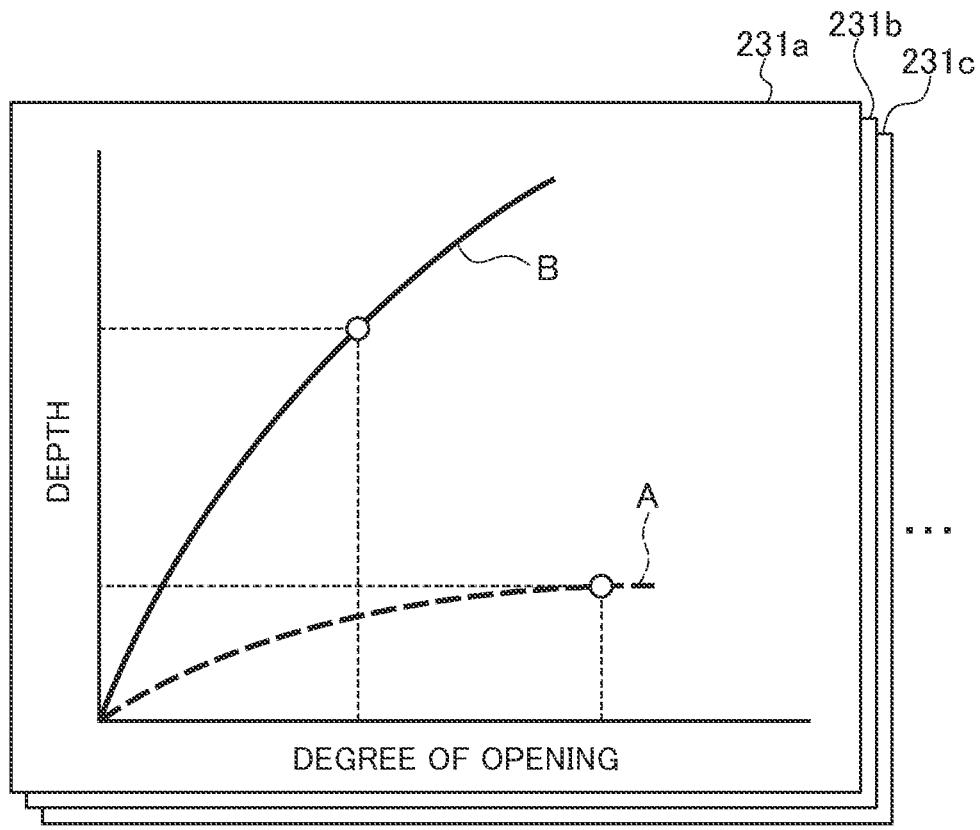
FIG. 5 is a graph showing an example of the correspondence between the degree of opening of the crack C held by the crack information DB 230 and the depth of the crack C.

FIG. 5 is a graph showing an example of the correspondence between the degree of opening of the crack C held by the crack information DB 230 and the depth of the crack C. In a correspondence relationship 231a shown in FIG. 5, the degree of opening of the crack C (horizontal axis) is correlated with the depth of the crack C (vertical axis).

Specifically, the curve A of the correspondence relationship 231a shows the relationship between the degree of opening and the depth in the case where the crack C is located in the vicinity of the contact portion of the tire 21 with the road surface R and in the vicinity of the tire maximum width portion of the tire side portion 21*a*. On the other hand, the curve B shows the relationship between the degree of opening and the depth in the case where the crack C is located at the contact portion of the tire 21 with the road surface R and at a region outside the vicinity of the tire maximum width portion.

That is, in the vicinity of the contact portion with the road surface R and in the vicinity of the tire maximum width portion, since the tire side portion 21*a* is deflected by the load of the construction vehicle 21, the degree of opening of the crack C tends to become large, and on the other hand, the depth of the crack C tends to become shallow.

On the other hand, in the area deviated from the contact portion with the road surface R and the vicinity of the tire maximum width portion, since the tire side portion 21 *a* is not bent as much as in the vicinity of the contact portion, the degree of opening of the crack C tends to become small, and on the other hand, the depth of the crack C tends to become deep.

The crack information DB 230 can hold, in addition to the correspondence relationship 231*a*, a plurality of correspondence relationships (correspondence relationship 231*b* and correspondence relationship 231*c* shown in FIG. 5) according to the position of the crack C in the tire side portion 21*a*, the deviation width, the deflection amount of the tire side portion 21*a*, and the like.

In FIG. 5, only the correspondence relations 231*a* to 231*c* are shown for the sake of convenience, but actually, data which can specify the correspondence relation between a large number of opening conditions or deviation width corresponding to the position and shape of the crack C and the depth of the crack C is retained.

The data may be held in a database form or as a regression equation. Further, the data may be generated based on the relationship between the actual degree of opening or the deviation width in the past and the depth of the crack C, or based on the simulation result using the finite element method (FEM).

Further, in the example shown in FIG. 5, the correspondence relationship between the degree of opening and the depth is created on the basis of the linear (Shape of the tire 21 from a side view) crack C, but when the shape of the crack C is not linear, a polynomial is used to approximate the shape, and the correspondence relationship between the degree of opening and the depth according to the coefficient of the polynomial may be created.

Figure 10:
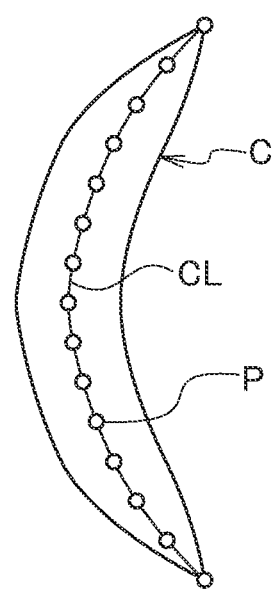
FIG. 10 is an illustration of the process of approximating the shape of a non-linear crack C using polynomials.

FIG. 10 is an explanatory diagram of a process of approximating the shape of the non-linear crack C using a polynomial. As shown in FIG. 10, the crack C is not linear but curved. In the case of such a crack C, the center line CL in the width direction of the crack C is discretized, and a plurality of end points P are set. The line between the end points P is approximated by a polynomial. A crack information DB 230 holds the coefficient of the polynomial, and the correlation between the intercept of the straight line and the depth of the crack C.

A crack shape acquisition unit 240 acquires the shape of a crack C on the outer surface of the tire 21. Specifically, the crack shape acquisition unit 240 specifies the shape of the crack C based on the image data acquired by the image data acquisition unit 210 or crack information including the size of the crack C acquired by the input information acquisition unit 220.

The crack shape acquiring unit 240 may use the result of correlation analysis of the shape of the crack C included in the plurality of image data acquired in the past to specify the shape of the crack C.

More specifically, the crack shape acquisition unit 240 acquires at least one of the degree of opening (width W) and the deviation width S of the crack C.

Further, the crack shape acquiring unit 240 can acquire the length (see length L in FIG. 7) of the crack C and the angle (angle θ in FIG. 7) in the extending direction of the crack C with respect to the tire radial direction as the shape of the crack C, in addition to the degree of opening and the deviation width S.

Further, the crack shape acquisition unit 240 can further acquire the positions of the crack C in the tire circumferential direction and the tire radial direction as the shape of the crack C, and can further acquire the deflection amount of the tire side portion 21*a* at the position of the crack C as the shape of the crack C.

The crack depth estimation unit 250 estimates the depth of the crack C based on the shape of the crack C acquired by the crack shape acquisition unit 240 and the correspondence relationships 231*a* to 231*c* held by the crack information DB 230.

Specifically, the crack depth estimation unit 250 specifies the shape of the crack C, and selects the optimum correspondence relation among the plurality of correspondence relations 231*a* to 231 *c* held in the crack information DB 230 according to the position of the crack C.

Further, the crack depth estimation unit 250 derives a value of the depth of the crack C from the value of the degree of opening (width W) or the deviation width S on the basis of the selected correspondence relationship. A crack depth estimation unit 250 uses the derived depth value as the depth of the crack C.

Although the deviation width S is difficult to detect from image data obtained by simply imaging the tire 21 (Specifically, the tire side portion 21*a* is provided.), the deviation width S can be detected by applying a marking (see Mark MK in FIG. 9), a seal or fine unevenness or the like to the tire side portion 21 *a* in advance. That is, the deviation width S can be detected by analyzing (for example, an image correlation method) the image data including the marks MK and the cracks C.

The deviation width S is, in short, the amount of shear deformation around the crack C, and can substitute for the degree of opening (width W). That is, the deviation width S is important information equal to the degree of opening when estimating the depth of the crack C.

When the crack C is non-linear (see FIG. 10), the crack depth estimation unit 250 estimates the depth of the crack C on the basis of the above-mentioned polynomial coefficient, the degree of opening (Width W) of the crack C, and the relationship between the deviation width S and the depth of the crack C.

Alternatively, when the crack C is non-linear, the crack depth estimation unit 250 approximates the shape of the crack C to a straight line, and estimates the depth of the crack C on the basis of an appropriate degree of opening (width W) of the crack C according to the approximated linear crack C or a correspondence relationship between the deviation width S and the depth of the crack C.

When approximating the crack depth to a straight line, the crack depth estimation unit 250 may use a method of using the angle of the long side of the circumscribed square of the crack C, or a method of using the angle of the long axis of the elliptical approximation by the least squares method of the crack C, in order to determine the angle of the extending direction of the crack C.

The life prediction unit 260 predicts the life (remaining life) of the tire 21 based on the depth of the crack C estimated by the crack depth estimation unit 250.

Specifically, the life prediction unit 260 can predict the life of the tire 21 by using correlation analysis of past data showing the relationship between the shape of the crack C and the remaining life of the tire 21.

The life prediction unit 260 can also predict the life of the tire 21 by executing simulation such as FEM analysis or model experiment using the shape of the crack C. Since the depth of the crack C is estimated by the crack depth estimation unit 250, the life of the tire 21 may be estimated using, for example, the simulation method described in the aforementioned Japanese Patent Laid-Open No. 4708759.

Alternatively, the life prediction unit 260 may predict the life of the tire 21 by combining the correlation analysis and the simulation.

As a simpler method, the life prediction unit 260 may predict the life of the tire 21 based on the estimated depth of the crack C and the gauge (rubber thickness) of the tire at the position of the crack C.

Specifically, the life prediction unit 260 predicts the remaining life of the tire 21 based on the depth of the crack C, based on the use limit gauge (e.g., 10 mm thickness) of the tire 21 from the tip in the depth direction of the crack C, or the amount of the remaining gauge up to the carcass ply (rubber thickness).

The life prediction unit 260 can notify the terminal device 60 or the portable terminal 100 of information on the predicted life of the tire 21 (number of hours remaining, estimated date of reaching the service limit, etc.).

(3) OPERATION OF TIRE STATE ESTIMATION SYSTEM

Next, the operation of the tire state estimation system 10 will be described. Specifically, the operation of estimating the depth of a crack generated on the outer surface of the tire 21 and predicting the life of the tire 21 (and the tire 22) will be described.

Figure 4:
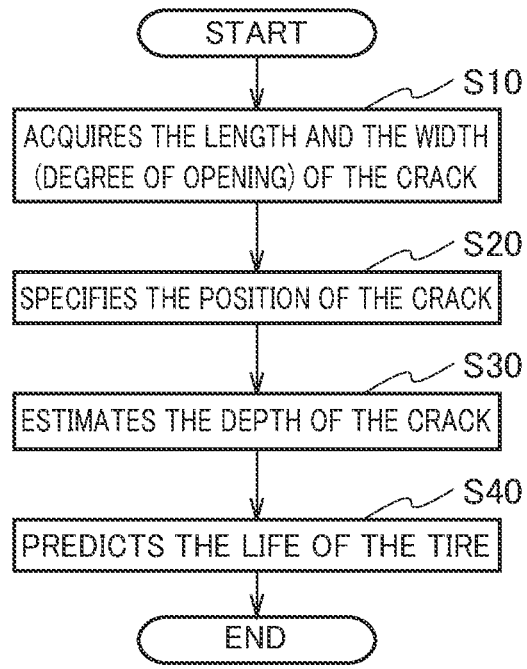
FIG. 4 is a diagram illustrating a predicted operational flow of tire life based on crack depth estimation by the tire information management server 200.

FIG. 4 shows the predicted operation flow of the tire life based on the crack depth estimation by the tire information management server 200.

As shown in FIG. 4, the tire information management server 200 acquires the length L and the degree of opening (Width W) of the crack C using image data including the crack C or information indicating the shape of the crack C inputted by the worker 50 (S 10).

Figure 6:
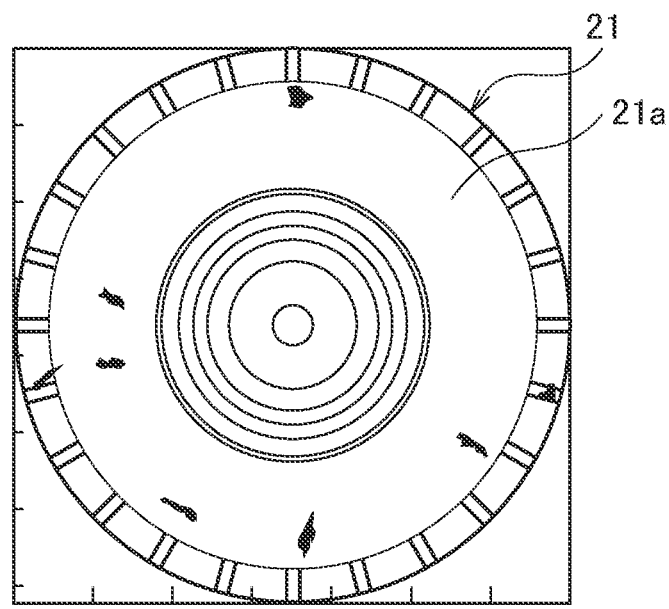
FIG. 6 shows an example of image data for an outer surface of a tire 21 having multiple cracks.
Figure 7:
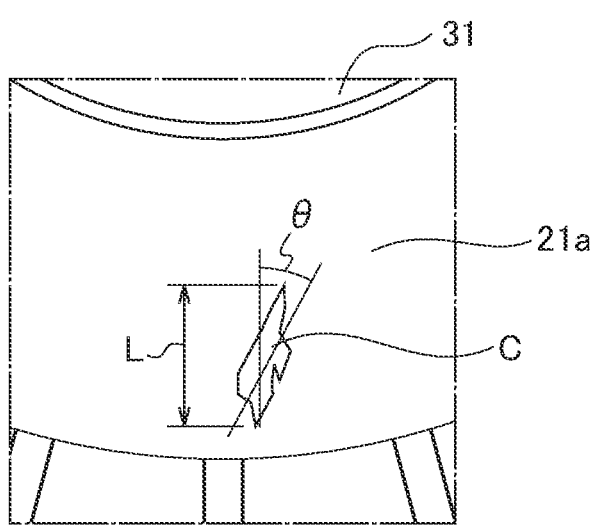
FIG. 7 is a partially enlarged view of a tire side portion 21a including a crack C.

FIG. 6 shows an example of image data of an outer surface of the tire 21 having a plurality of cracks. FIG. 7 is a partially enlarged view of the tire side portion 21a including the crack C.

The tire information management server 200 acquires the length L and the degree of opening (width W) for a specific crack included in the image data as shown in FIG. 6. Note that a particular crack may be selected manually by the worker 50, or a crack that meets a condition (for example, the area of a crack.) may be selected automatically by image processing. As a result, the crack C shown in FIG. 7 is selected.

The tire information management server 200 specifies the position of the crack C (S 20). Specifically, the tire information management server 200 specifies the position of the crack C in the tire circumferential direction and the position of the crack C in the tire radial direction.

Next, the tire information management server 200 estimates the depth D of the crack C based on the length L, the degree of opening (width W), and the position of the crack C (S 30).

Specifically, as described above, the tire information management server 200 estimates the depth of the crack C based on the shape of the crack C and any of the correspondence relationships 231a to 231c (see FIG. 5).

Figure 8:
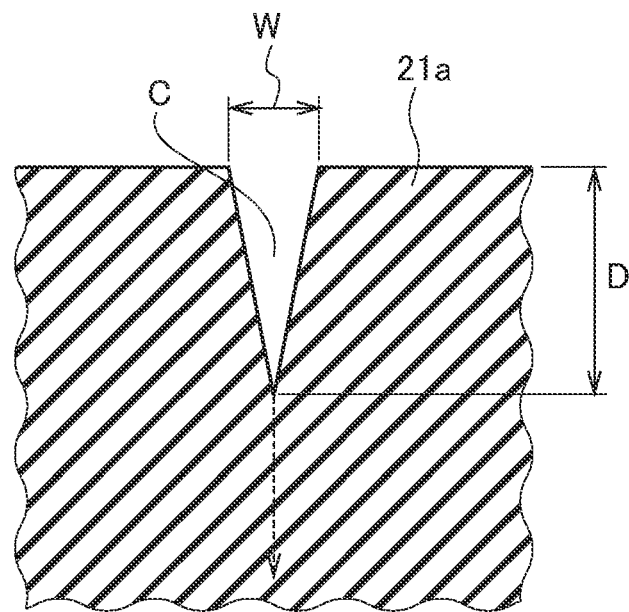
FIG. 8 schematically shows the cross-sectional shape of crack C.

FIG. 8 schematically shows the cross-sectional shape of the crack C. Specifically, FIG. 8 shows the cross-sectional shape of the crack C in the tire side portion 21a along the tire circumferential direction and the tire width direction.

As shown in FIG. 8, the crack C has a depth D toward the inner surface (carcass ply side) of the tire (refer to the dotted arrow in the figure). When the front end in the depth direction of the crack C reaches the use limit gauge amount or the carcass ply, the tire 21 becomes difficult to be mounted on the construction vehicle 20 for use and reaches the service life.

The tire information management server 200 predicts the life of the tire 21 based on the estimated depth D of the crack C (S 40). Specifically, as described above, the tire information management server 200 predicts the life of the tire 21 based on a correlation analysis of past data indicating a relationship between the shape of the crack C and the remaining life of the tire 21, a simulation such as an FEM analysis or a model experiment, or a combination thereof.

Alternatively, the tire information management server 200 may predict the life of the tire 21 based on the estimated depth of the crack C and the gauge (rubber thickness) of the tire at the position of the crack C.

The tire information management server 200 notifies the terminal device 60 or the portable terminal 100 of the predicted information on the life of the tire 21 (number of hours remaining, estimated date of reaching the service limit, etc.).

In the operation flow described above, the degree of opening (width W) of the crack C is used to estimate the depth D, but the deviation width S may be used instead of the degree of opening.

Figure 9:
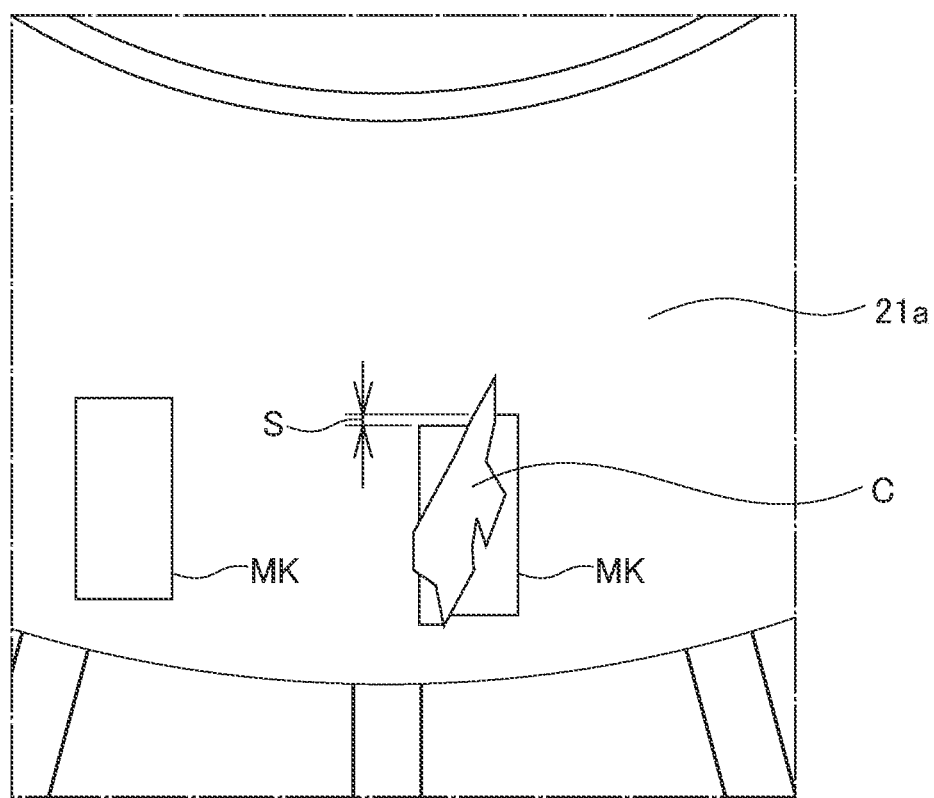
FIG. 9 is a partially enlarged view of the tire side portion 21a when the depth of the crack C is estimated using the deviation width S (image data).

FIG. 9 is a partially enlarged view of the tire side portion 21a in the case of estimating the depth of the crack C using the deviation width S (image data).

As shown in FIG. 9, in order to detect the deviation width S of the crack C, that is, the amount of shear deformation around the crack C, the tire side portion 21a is previously provided with a square mark MK at a desired position. After that, when a crack C is generated so as to overlap a part of the mark MK (however, if the mark MK exists in the vicinity of the crack C, the deviation width S can be detected.), the tire information management server 200 analyzes image data including the crack C and the mark MK, and detects a deviation width S.

Thus, the tire information management server 200 estimates the depth D of the crack C based on the deviation width S. For this estimation, the correspondence relationship shown in FIG. 5, specifically, the correspondence relationship between the deviation width S and the depth D, is used.

(4) FUNCTION AND EFFECTS

According to the embodiment described above, the following effects can be obtained. Specifically, the tire state estimation system 10 estimates the depth of the crack C based on the shape of the crack C and the corresponding relationship by using the corresponding relationship 231a to 231c in which at least one of the degree of opening (width W) or the deviation width S of the crack C is associated with the depth D of the crack C. Further, the tire state estimation system 10 predicts the life of the tire 21 based on the estimated depth D of the crack C.

Therefore, even when the construction vehicle 20 traveling on an uneven ground such as a mine is equipped with the tire 21 and it is difficult to acquire a concrete shape (depth D) of a crack C, the depth D can be estimated with high accuracy and the life of the tire 21 can be predicted.

That is, according to the tire state estimation system 10, the depth of the crack C can be estimated based on the shape of the crack C recognizable from the outer surface of the tire 21, and the life of the tire 21 can be predicted. Thus, the operation interruption of the construction vehicle 20 due to the failure of the tire 21 can be surely avoided.

In the present embodiment, the tire state estimation system 10 (Tire information management server 200) can acquire the length of the crack C and the angle θ in the extending direction of the crack C with respect to the tire radial direction as the shape of the crack C, in addition to at least one of the degree of opening (width W) and the deviation width S of the crack C. Further, the tire state estimation system 10 can acquire the positions of the crack C in the tire circumferential direction and the tire radial direction as the shape of the crack C.

Thus, since the relative position and the extending direction of the crack C in the tire side portion 21 a are specified, the depth D can be estimated more accurately by preparing the correspondence relationships 231a to 231c as shown in FIG. 5 for detailed conditions.

Further, in the present embodiment, the tire state estimation system 10 can further acquire the amount of deflection of the tire side portion 21a at the position of the crack C as information indicating the shape of the crack C. The amount of deflection of the tire side portion 21a is useful for estimating the depth D, as described above, so that the depth D can be estimated more accurately.

In the present embodiment, the tire state estimation system 10 can also predict the life of the tire 21 based on the estimated depth D and the gauge of the tire 21 at the position of the crack C. Such a method has an advantage that it does not require high processing power and can be implemented relatively easily.

(5) OTHER EMBODIMENTS

While the contents of the present invention have been described in accordance with the above embodiments, it will be apparent to those skilled in the art that the present invention is not limited to these descriptions and that various modifications and improvements are possible.

For example, in the above-described embodiment, the tire information management server 200 includes the life prediction unit 260, but the life prediction unit 260 is not essential. That is, the tire information management server 200 may notify the depth D of the crack C estimated by the crack depth estimation unit 250 to the terminal device 60 or the portable terminal 100. In this case, the worker 50 may determine, based on the depth D notified from the tire information management server 200 to the terminal device 60 or the portable terminal 100, whether the tire 21 requires maintenance or whether the tire 21 can be continuously used.

In the above-described embodiment, when the shape of the crack C is not linear, a polynomial is used to approximate the shape, and a correspondence relationship between the degree of opening and the depth according to the coefficient of the polynomial is created, but the method of approximation is not limited to this. For example, the relationship between the degree of opening and the depth corresponding to the coefficient at each order when approximated using a Fourier series may be created.

In the above-described embodiment, the tire information management server 200 estimates the depth D of the crack C and predicts the life of the tire 21, but if the processing capability is satisfied, the terminal device 60 or the portable terminal 100 may perform the estimation and prediction. Alternatively, a part of the processing may be executed by the tire information management server 200, and another processing may be executed by the terminal device 60 or the portable terminal 100.

That is, the tire state estimation system 10 as a whole may perform the estimation and prediction processing, and the tire state estimation system 10 may perform part or all of the estimation and prediction processing by using a service on a communication network.

In the above embodiment, a dump truck is described as an example, but other construction vehicles such as an articulated dump truck and a wheel loader may be used.

Although embodiments of the invention have been described as described above, the discussion and drawings which form part of this disclosure should not be construed as limiting the invention. Various alternative embodiments, embodiments and operational techniques will be apparent to those skilled in the art from this disclosure.

REFERENCE SIGNS LIST 10 tire state estimation system
20 construction vehicle
21, 22 tires
21a tire side portion
30 rim wheel
31 rim flange portion
40 communication network
50 worker
60 terminal device
100 portable terminal
200 tire information management server
210 image data acquisition unit
220 input information acquisition unit
230 crack information DB
231a correspondence relationship
240 crack shape acquisition unit
250 crack depth estimation unit
260 life prediction unit.

The invention claimed is:

1. A tire state estimation system for predicting a life of a tire based on a state of a crack generated on an outer surface of the tire, comprising:
   a crack shape acquisition unit for acquiring the shape of the crack on the outer surface;
   a crack information holding unit for holding a correspondence relationship in which at least either degree of opening or deviation width of the crack based on the shape of the crack is associated with depth of the crack; and
   a crack depth estimation unit for estimating the depth of the crack based on the shape of the crack acquired by the crack shape acquisition unit and the correspondence relationship;

wherein the crack shape acquisition unit acquires a length of the crack and an angle in an extending direction of the crack with respect to a tire radial direction as the shape of the crack, in addition to at least one of the degree of opening and the deviation width of the crack.

2. The tire state estimation system according to claim 1, wherein the crack shape acquisition unit further acquires an amount of deflection of the tire side portion at the position of the crack as the shape of the crack.

3. The tire state estimation system according to claim 2, further comprising a life prediction unit for predicting the life of the tire based on the estimated crack depth.

4. The tire state estimation system according to claim 1, further comprising a life prediction unit for predicting the life of the tire based on the estimated crack depth.

5. The tire state estimation system according to claim 4, wherein the life prediction unit predicts the life of the tire based on the estimated crack depth and the gauge of the tire at the crack position.

\* \* \* \* \*